United States Patent
Uhrie et al.

(10) Patent No.: US 8,491,701 B2
(45) Date of Patent: *Jul. 23, 2013

(54) METHODS AND SYSTEMS FOR LEACHING A METAL-BEARING ORE FOR THE RECOVERY OF A METAL VALUE

(75) Inventors: John Lawrence Uhrie, Scottsdale, AZ (US); Gabe Bowman, Safford, AZ (US); Cristian Alejandro Caro Matus, Thatcher, AZ (US); Percy Mayta, Thatcher, AZ (US); Scott Hoenecke, Thatcher, AZ (US); Manuel Chavez, Camala II (CL)

(73) Assignee: Freeport-McMoran Corporation, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/356,711

(22) Filed: Jan. 24, 2012

(65) Prior Publication Data

US 2012/0118110 A1 May 17, 2012

Related U.S. Application Data

(63) Continuation of application No. 12/545,783, filed on Aug. 21, 2009, now Pat. No. 8,118,907.

(60) Provisional application No. 61/091,691, filed on Aug. 25, 2008.

(51) Int. Cl.
*C22B 3/18* (2006.01)
*C22B 1/14* (2006.01)

(52) U.S. Cl.
USPC ............................ 75/722; 75/743; 75/770

(58) Field of Classification Search
USPC ............................ 75/743, 722, 770; 266/101
See application file for complete search history.

(56) References Cited

U.S. PATENT DOCUMENTS

| | | | |
|---|---|---|---|
| 5,127,942 A | 7/1992 | Brierley et al. | |
| 5,196,052 A | 3/1993 | Gross et al. | |
| 5,228,900 A | 7/1993 | Stephens et al. | |
| 5,244,493 A | 9/1993 | Brierley et al. | |
| 5,246,486 A * | 9/1993 | Brierley et al. | 75/743 |
| 5,332,559 A | 7/1994 | Brierley et al. | |

(Continued)

FOREIGN PATENT DOCUMENTS

| | | |
|---|---|---|
| WO | W02006099659 | 9/2006 |
| WO | W02010012030 | 2/2010 |
| WO | W02011014873 | 2/2011 |

OTHER PUBLICATIONS

Opposition filed by BHP Billiton S.A. Limited dated Jul. 21, 2010 in corresponding patent application No. 1773-2009 in Chile [and machine translation of same in English].

(Continued)

*Primary Examiner* — George Wyszomierski
*Assistant Examiner* — Tima M McGuthry Banks
(74) *Attorney, Agent, or Firm* — Snell & Wilmer L.L.P.

(57) ABSTRACT

A system and method for recovering a metal value from a metal-bearing ore material are provided. A metal-bearing ore can be mixed with certain substances and to form an agglomerated ore. In an intermediate state, between agglomeration and heap formation, bacteria can be added to the metal-bearing ore material to produce an augmented ore. The augmented ore can then be formed into a heap.

10 Claims, 5 Drawing Sheets

U.S. PATENT DOCUMENTS

| | | | |
|---|---|---|---|
| 5,688,304 | A | 11/1997 | Kohr et al. |
| 5,779,762 | A | 7/1998 | Kohr et al. |
| 5,873,927 | A | 2/1999 | Schaffner et al. |
| 6,096,113 | A | 8/2000 | Schaffner et al. |
| 6,099,615 | A | 8/2000 | Underwood |
| 6,103,204 | A | 8/2000 | Lizama et al. |
| 6,110,253 | A | 8/2000 | Kohr et al. |
| 6,207,443 | B1 | 3/2001 | King |
| 6,383,458 | B1 | 5/2002 | Brierley et al. |
| 6,387,239 | B1 | 5/2002 | Duyvesteyn |
| 6,696,283 | B1 | 2/2004 | Brierley et al. |
| 6,736,877 | B2 | 5/2004 | Harlamovs et al. |
| 7,022,504 | B2 | 4/2006 | Hunter |
| 7,416,882 | B2 * | 8/2008 | Kohr .............................. 435/262 |
| 7,455,715 | B2 | 11/2008 | Harlamovs et al. |
| 7,837,760 | B2 | 11/2010 | Morales Cerda et al. |
| 8,118,907 | B2 * | 2/2012 | Uhrie et al. ...................... 75/722 |
| 8,119,085 | B2 * | 2/2012 | Hunter et al. ................... 423/27 |
| 2003/0089201 | A1 | 5/2003 | Harlamovs et al. |
| 2003/0136632 | A1 * | 7/2003 | Bernard et al. ............... 198/300 |
| 2004/0131520 | A1 | 7/2004 | Bruynesteyn |
| 2009/0061503 | A1 | 3/2009 | Hunter et al. |
| 2009/0235784 | A1 | 9/2009 | Norton |
| 2011/0023662 | A1 | 2/2011 | Dew et al. |

OTHER PUBLICATIONS

PCT International Preliminary Report on Patentability from corresponding International Application No. PCT/US2009/054695 issued Mar. 10, 2011.

Brierley, C.L., "Bacterial Succession in Bioheap Leaching," Hydrometallury 59 (2001) 249-255.

PCT International Search Report and Written Opinion from corresponding International Application No. PCT/US2009/054695 dated Nov. 27, 2009.

Non-Final Office Action from U.S. Appl. No. 12/545,783, dated Sep. 22, 2010.

Non-Final Office Action from U.S. Appl. No. 12/545,783, dated Jan. 18, 2011.

Final Office Action from U.S. Appl. No. 12/545,783, dated May 9, 2011.

Advisory Action from U.S. Appl. No. 12/545,783, dated Jul. 18, 2011.

Applicant-Initiated Interview Summary from U.S. Appl. No. 12/545,783, dated Sep. 28, 2011.

Examiner-Initiated Interview Summary from U.S. Appl. No. 12/545,783, dated Oct. 14, 2011.

Notice of Allowance from U.S. Appl. No. 12/545,783, dated Oct. 18, 2011.

* cited by examiner

METHODS AND SYSTEMS FOR LEACHING A METAL-BEARING ORE FOR THE RECOVERY OF A METAL VALUE

CROSS REFERENCE TO RELATED APPLICATIONS

This application claims priority to and is a continuation of U.S. patent application Ser. No. 12/545,783, now U.S. Pat. No. 8,118,907, filed on Aug. 21, 2009, entitled "METHODS AND SYSTEMS FOR LEACHING A METAL-BEARING ORE FOR THE RECOVERY OF A METAL VALUE" The '783 application claims priority to and the benefit of U.S. Provisional Application Ser. No. 61/091,691, filed on Aug. 25, 2008, entitled "System and Method for Biostimulated Heap Leaching of Run of Mine Ore for the Recovery of Metal Values." Both the '783 Application and the '691 Application are incorporated by reference herein.

FIELD OF INVENTION

The present invention generally relates to methods and systems for recovering metal values from metal-bearing ores and, more specifically, to heap leaching methods and systems employing a bio-augmentation process.

BACKGROUND

Heap leaching provides a low-cost method of extracting metal values from relatively low-grade metal-bearing materials, and has found particular application in the processing of metal-bearing ores. Generally, in traditional heap leaching operations, an ore is mined, crushed, and then transported to a heap location where it is stacked onto an impervious pad. A suitable acidic solution is dispensed onto the heap, and the resulting leach solution trickles slowly under the force of gravity to the pad, which typically has a sloped base to allow the solution to flow into collection drains for further processing, such as, for example, in a conventional, solvent extraction/electrowinning (SX/EW) process or a direct electrowinning (DEW) process.

Bio-stimulation, in general, provides a method to improve the efficiency of heap leaching operations. That is, the introduction of a suitable bacterial strain or other microorganism into the process, such as, during an agglomeration step or via a raffinate, may result in catalyzation of the oxidation reaction within the heap. Such bio-oxidation processes typically involve the use of a cultured strain of high-concentration bacteria.

Currently known bio-stimulation heap leaching processes are suboptimal in a number of respects. For example, notwithstanding advances in bio-oxidation and agglomeration techniques, these processes generally range from being time consuming to being cost-inefficient.

Accordingly, there is a need for methods and systems for bio-stimulation heap leaching that maintain the traditional cost-efficiency and simplicity of heap leaching processes while improving efficiency and metal recovery capabilities.

SUMMARY

In accordance with various embodiments of the present invention, a bio-augmentation process is provided. The process can include mixing a metal-bearing material with certain substances to form an agglomerated ore. The agglomerated ore can then be transported to form a heap. Prior to heap formation, a biomass rich solution effluent generally produced from a bioreactor or operating heap leach operation is added to the agglomerated ore to produce a biologically augmented ore. The augmented ore is then progressively formed into a heap. Once the heap is formed, raffinate and nutrients may be delivered to the heap. Finally, metal may be recovered from the leach solution generated by the heap by utilizing a direct electrowinning (DEW) process or a conventional, solvent extraction/electrowinning (SX/EW) process.

In accordance with various embodiments of the present invention, a leaching process can include bio-augmentation. In accordance with an exemplary embodiment, the heap leach operation includes providing an ore, agglomerating the ore, adding bacteria or other microorganisms to the agglomerated ore to form an augmented ore, forming a heap with the augmented ore, and may further include biologically augmenting the heap through addition of at least one bacterial strain or other microorganisms to produce a metal-bearing solution.

Further areas of applicability will become apparent from the detailed description provided herein. It should be understood that the description and specific examples are intended for purposes of illustration only and are not intended to limit the scope of the present invention.

BRIEF DESCRIPTION OF THE DRAWINGS

The subject matter of the present invention is particularly pointed out and distinctly claimed in the concluding portion of the specification. A more complete understanding of the present invention, however, may best be obtained by referring to the detailed description when considered in connection with the drawing figures, wherein like numerals denote like elements and wherein:

DETAILED DESCRIPTION

The following description is merely exemplary in nature and is not intended to limit the present invention, its applications, or its uses. It should be understood that throughout the drawings, corresponding reference numerals indicate like or corresponding parts and features. The description of specific examples indicated in various embodiments of the present invention are intended for purposes of illustration only and are not intended to limit the scope of the invention disclosed herein. Moreover, recitation of multiple embodiments having stated features is not intended to exclude other embodiments having additional features or other embodiments incorporating different combinations of the stated features.

Furthermore, the detailed description of various embodiments herein makes reference to the accompanying drawing figures, which show various embodiments by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, steps or functions recited in descriptions any method, system, or process, may be executed in any order and are not limited to the order presented. Moreover, any of the step or functions thereof may be outsourced to or performed by one or more third parties. Furthermore, any reference to singular includes plural embodiments, and any reference to more than one component may include a singular embodiment.

The present invention generally relates to methods and systems for recovering metal values from metal-bearing ores and, more specifically, to heap leaching methods and systems employing bio-augmentation. Various embodiments of the present invention provide a process for recovering metals value through bacteria bio-augmented heap leaching, conditioning, and electrowinning. These improved methods and systems disclosed herein achieve an advancement in the art by providing metal value recovery methods and/or systems that enable significant enhancement in metal value yield as compared to conventional metal value recovery methods and systems.

In accordance with various embodiments of the present invention, bio-augmentation is provided where a metal-bearing material is mixed with certain substances to form an agglomerated ore. The agglomerated ore is then subjected to bio-augmentation prior to being formed into a heap or transported to an existing heap or leach stockpile system. In an aspect of the present invention, during transportation, between agglomeration and heap formation, an effluent solution generated in a bioreactor or from a heap leaching process is added to the agglomerated ore to produce a biologically augmented ore. The augmented ore is formed into a heap or layered upon an existing heap. Once the heap is formed or at the completion of any stage at which metal recovery may commence, an inoculant may be delivered to the heap. The inoculant may comprise a raffinate and/or nutrients. Finally, a metal value may be recovered from the solution generated by the heap leaching process by utilizing a direct electrowinning (DEW) process or a conventional, solvent extraction/electrowinning (SX/EW) process.

Various embodiments of the present invention exhibit significant advancements over prior art processes, particularly with regard to metal recovery and process efficiency. In accordance with an exemplary embodiment of the present invention, a process for recovering a metal value from a metal-bearing material includes the steps of: (i) agglomerating a metal-bearing material to form an agglomerated metal-bearing material; (ii) bio-augmenting the agglomerated metal-bearing material prior to forming a heap; (iii) forming the heap or a portion of the heap; (iv) leaching the heap to yield a metal-containing solution; (v) conditioning the metal-containing solution without the use of solvent/solution extraction to yield a metal-bearing solution; and (vi) electrowinning the metal-bearing solution to yield a metal value and a metal-bearing lean electrolyte stream. The process can further include treating at least a portion of the lean electrolyte stream using a solvent/solution extraction technique. In an aspect of this exemplary embodiment, the agglomerated metal-bearing material is augmented while being transported to the heap.

In an another exemplary embodiment, a process for recovering a metal value from a metal-bearing material includes the steps of: (i) agglomerating a metal-bearing material to form an agglomerated metal-bearing material; (ii) bio-augmenting the agglomerated metal-bearing material prior to forming a heap; (iii) forming the heap or a portion of the heap; (iv) leaching the heap to yield a metal-bearing solution; (v) treating at least a portion of a metal-bearing solution from the leaching step in a solvent/solution extraction and electrowinning operation; and (vi) recovering a metal value from the metal-bearing solution. In an aspect of this exemplary embodiment, the agglomerated metal-bearing material is biologically augmented while being transported to the heap.

Examples of metal values include, but are not limited to, copper, nickel, zinc, silver, gold, germanium, lead, arsenic, antimony, chromium, molybdenum, rhenium, tungsten, iron, ruthenium, osmium, cobalt, rhodium, iridium, palladium, platinum, uranium, and/or rare earth metals. More preferably, the metal values can be copper, nickel, and/or zinc. Most preferably, the metal value is copper.

Figure 1:
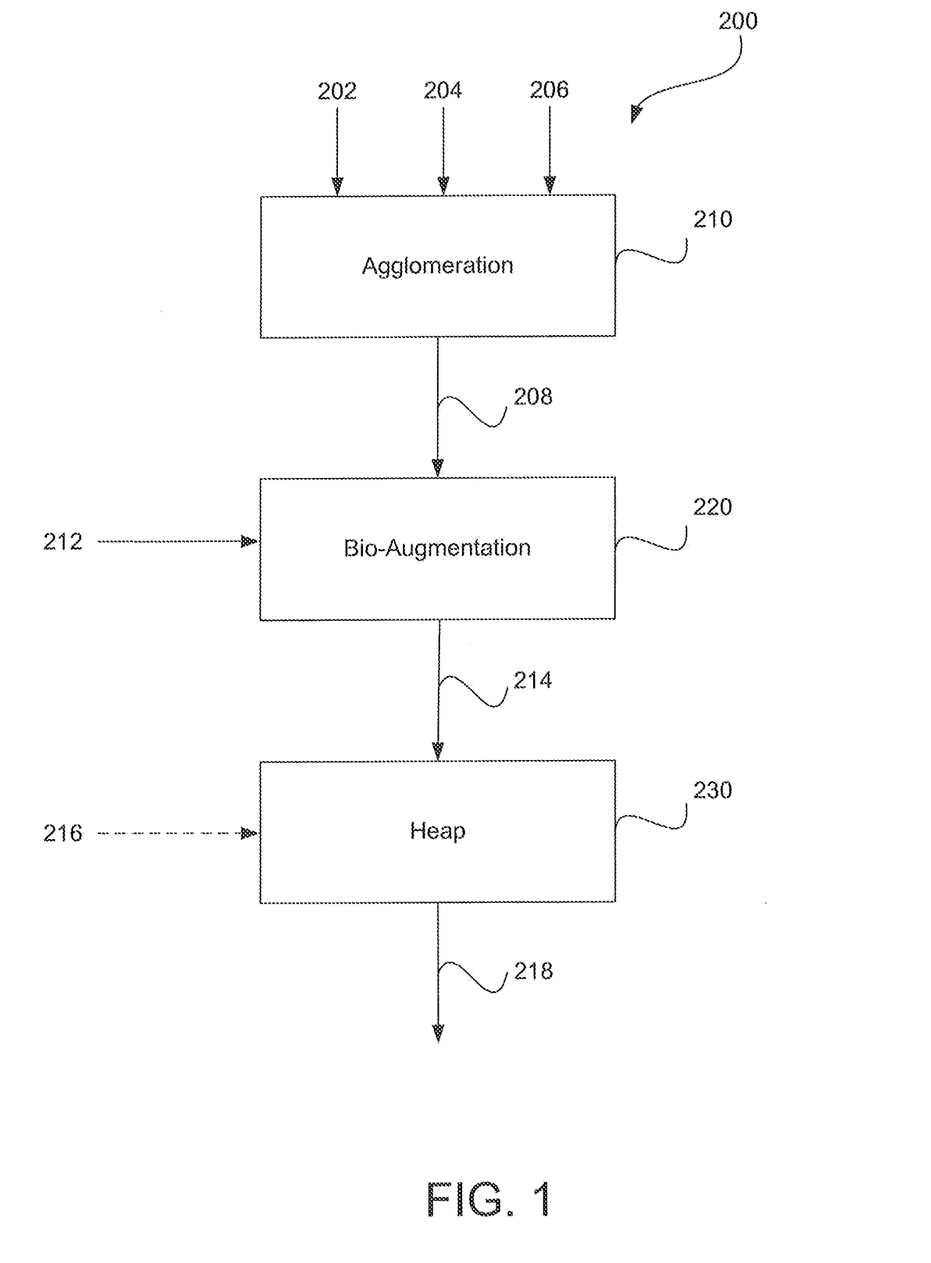
FIG. 1 is a flow diagram illustrating a leaching process enhanced through bio-augmentation in accordance with various embodiments of the present invention.

Referring now to FIG. 1, a bio-augmentation leaching process 200 is illustrated according to various embodiments of the present invention. In accordance with various aspects of the embodiments, a metal-bearing material 202 may be provided for processing from which copper and/or other metal values may be recovered. Metal-bearing material 202 may be an ore, a concentrate, a process residue, or any other material from which metal values may be recovered. Metal values, such as those described herein, may be recovered from metal-bearing material 202. In an aspect of the present invention, metal-bearing material 202 comprises a refractory metal sulfide.

In accordance with various embodiments, the metal-bearing material 202 can comprise chalcocite, pyrite, chalcopyrite, arsenopyrite, bornite, covellite, digenite, cobaltite, enargite, galena, greenockite, millerite, molybdentite, orpiment, pentlandite, pyrrhotite, sphalerite, stibnite, and/or any other suitable metal-bearing ore material. Preferably, the metal-bearing ore comprises primary or secondary sulfides such as chalcocite, bornite, pyrite, or chalcopyrite, or a blend of such mineral species.

Various aspects and embodiments of the present invention, however, prove especially advantageous in connection with the recovery of copper from copper sulfide ores, such as, for example, chalcopyrite ($CuFeS_2$), chalcocite ($Cu_2S$), bornite ($Cu_5FeS_4$), covellite (CuS), enargite ($Cu_3AsS_4$), digenite ($Cu_9S_5$) and mixtures thereof. Thus, metal-bearing material 202 may be a copper ore or concentrate, and preferably, is a copper sulfide ore or concentrate.

Metal-bearing material 202 may comprise ore in a number of states. Before an ore deposit is mined, the ore is said to be in an in-situ state. During mining, metal-bearing material 202 may progress through multiple states as it is harvested, collected, transported, and processed. For example, metal-bearing material 202 as harvested at the mining site is often referred to as run of mine (or "ROM") ore. ROM ore is produced by, for example, blasting, open pit mining, and other surface and subterranean ore extraction techniques. As such, ROM ore includes ore of various sizes from ore as small as powder up to and including boulders.

In an aspect of the present invention, all or a portion of metal-bearing material 202 may be further processed via size classification and/or crushing to achieve a desired particle size distribution, such that, substantially all of the particles are of a size to allow effective agglomeration 210 of metal-bearing material 202 during agglomeration 210 and allow for optimal economic recovery of the contained metal values.

In accordance with various embodiments of the present invention, metal-bearing material 202 has a particle distribution of any combination of particle distributions. The particle distribution may have a combination of fine and coarse particles. Any particle distribution that maximizes bio-oxidation and metal recovery is useful. A preferred particle distribution allows oxygen and nutrients to permeate through heap 230 for a desirable environment for bacteria 302 growth and optimum bio-oxidation activity, while maximizing copper recovery.

In accordance with various embodiments, metal-bearing material 202 is subjected to agglomeration 210 which serves to combine metal-bearing material 202 with water 204 and acid 206 to form an agglomerated ore 208. As will be appreciated by those skilled in the art, water 204 and acid 206 can be mixed into a solution prior to combination with metal-bearing material 202. In an exemplary embodiment, raffinate provided from any other metal recovery process (not shown) may be used to form agglomerated ore 208 and as such, raffinate may comprise both water 204 and acid 206. In an aspect of this exemplary embodiment, at least one of water 204 and acid 206 can be admixed with raffinate and combined with metal-bearing material 202 to form agglomerated ore 208. In various embodiments, raffinate can be an aqueous product of a solvent extraction process, such as, for example, a SX/EW process.

In an aspect of the invention, agglomeration 210 involves metal-bearing material 202 being combined with water 204 and acid 206 in an agglomeration drum. An agglomeration drum may be any suitable agglomeration drum known in the art. In accordance with an exemplary embodiment, water 204 and acid 206 may be combined with the metal-bearing material 202 within the agglomeration drum. The quantity of the water 204 and the quantity and strength of the acid 206 vary with respect to the type of metal-bearing material 202 used. In this regard, raffinate may be mixed with at least one of water 204 and acid 206, which may optimize the aqueous solution that is utilized during agglomeration 210. Metal-bearing material 202 is mixed with the water 204 and acid 206 in the agglomeration drum to produce an agglomerated ore 208. Agglomeration 210 may also include the blending of coarse portions and fine portions of metal-bearing material 202, in order to maximize metal recovery while maintaining heap permeability.

In an aspect of the invention, agglomerated ore 208 can be transported to heap 230 via a conveyor belt. It should be understood that any suitable intermediate state would suffice for the transport of agglomerated ore 208 to heap 230. While agglomerated ore 208 is transported to heap 230, effluent solution 212 may be applied using any suitable application method including, but not limited to, irrigation lines, streams, sprayers, drip lines, misters, and the like. In an exemplary embodiment, effluent solution 212 may be applied onto agglomerated ore 208 on the conveyor belt via low pressure spray nozzles. A hood over the spray area may be utilized to contain the spray of effluent solution 212 under windy conditions. Bio-augmentation 220 can also be performed at or near the end of agglomeration 210. In an aspect of the present invention, bio-augmentation 220 occurs at or near the end of the time agglomerated ore 208 is in an agglomeration drum or agglomeration apparatus.

Referring again to FIG. 1 after agglomerated ore 208 has been prepared, it may be transported to a heap 230. In accordance with the present invention in its various aspects, agglomerated ore 208 is subjected to bio-augmentation 220 prior to being stacked or formed into heap 230. Bio-augmentation 220, as used herein, refers to any process or method that provides bacteria or archaea or any other suitable microorganism to agglomerated ore 208. For example, bio-augmentation 220, can be any process or method that inoculates agglomerated ore 208 with at least one strain of bacteria or archaea. In accordance with exemplary embodiments, bio-augmentation 220 comprises augmenting agglomerated ore 208 with effluent solution 212 comprising bacteria to form augmented ore 214.

In accordance with various embodiments of the present invention, any form of microorganism, including but not limited to bacteria or archaea, known or developed hereafter that is useful in leaching a metal may be used to form an effective biological culture to facilitate bio-augmentation 220. The following bacteria and archaea are exemplary:

Group A: *Acidithiobacillus ferrooxidans; Acidithiobacillus thiooxidans; Acidithiobacillus organoparus; Acidithiobacillus acidophilus; Acidithiobacillus caldus; Thiobauillus concretivorus; Ferrofefunis bagdadii;*

Group B: *Leptospirillum ferriphilum, Leptospirillum ferrooxidans, Leptospirillum* sp.

Group C: *Sulfobacillus thermosulfidooxidans; Sulfolobus* sp.;

Group D: *Sulfolobus acidicaldarius; Sulfolobus BC; Sulfolobus solfataricus*; and *Acidianus brierleyi* and the like.

These bacteria and archaea are generally available, for example, from American Type Culture Collection, or like culture collections, or are known in the art.

Alternatively, such bacteria and archaea may be obtained from a naturally occurring source and then cultured, or otherwise grown in any conventional, now known, or hereafter devised method. For example, in certain applications, naturally occurring biological strains may be used. In accordance with various embodiments, mixed bacterial strains occurring naturally in raffinate streams may be initially added to an aqueous solution and allowed to undergo a natural selection process. Such selection process may involve, among other things, the reaction environment. It has been found that such naturally occurring microorganisms may be particularly useful in connection with applications of the present invention in connection with mining activities. However, microorganisms such as the above mentioned bacterial and archeal strains may be selected by any technique now know or developed in the future. In accordance with an exemplary embodiment of the invention, at least one bacterial and/or archeal strain may be selected from the list provided above.

These microorganisms may be classified in terms of their temperature tolerances and optimized growth and activity ranges as follows: mesophiles, moderate thermophiles, and extreme thermophiles. Mesophilic bacteria generally thrive under moderate operating temperatures, for example, less about than 40° C.; moderate thermophiles are generally optimized for higher temperature conditions, for example, about 37° C. to about 60° C.; and, extreme thermophiles of the archaea class, generally thrive at higher temperatures, for example greater than about 55° C. Group A and B bacteria are generally considered mesophilic and are grow under conditions at or below about 40° C.; Group C bacteria are representative of the moderate thermophilic type and are preferably operated under conditions at or below about 60° C.; and, Group D archaea are representative of the extreme thermophile group and grow under conditions from about 60° C. to about 80° C.

Various mixtures of microorganisms from various groups can also be obtained. For example, various mixtures of mesophilic bacteria and moderately thermophilic bacteria may be mixed together to provide active bacteria variations in temperature of heap 230 during leaching. For example, if the temperature of the heap 230 varies between 35° C. and 45° C., such a mixture of bacteria would allow for leaching of a metal within the range of the temperature variation.

In accordance with an aspect of the present invention, a mixture of bacteria can be utilized under varying operating conditions of heap 230. For example, mixtures of bacteria in groups A and B may be used. For example, if conditions of heap 230 include high ferric-ferrous iron ratios, bacteria group B may be better suited for leaching under such conditions. If ferric-ferrous iron rations are low, bacteria group A may be more efficient in leaching a metal value from heap 230. Furthermore, if the pH of heap 230 fluctuates, a combination of bacteria in groups A and B may be effective in leaching. Since sulfide oxidation optimally takes place at a pH of less than about 2.5 and may be more efficient in a range from about 1.2 to about 2.0, only bacteria that can survive in such harsh environments may be utilized for leaching metal value from heap 230. For example, when the pH moves closer to 2, bacteria in group B may be more efficient, as opposed to when the pH moves closer to 1.2, the bacteria of group A may be more efficient. Those skilled in the art will appreciate that any combination of bacteria listed herein as well as any bacteria known in the art or hereafter to follow, may be used individually or in combination for the most effective leaching based on static or varying conditions of heap 230.

In accordance with an aspect of the present invention, *Acidithiobacillus caldus* bacteria can be utilized under operating conditions at or about 40° C. For example, a suitable biological environment has been prepared by collecting and culturing mine water containing such bacteria in a conventional manner using methods now known or hereafter developed. In accordance with various embodiments of the present invention, a biomass concentration on the order of from about $1 \times 10^5$ to about $1 \times 10^9$ cells per milliliter of bacteria is preferred but, as will be appreciated by those skilled in the art, other biomass concentrations may be utilized depending on the individual conditions of a process and/or the configuration of a system.

However, any bacteria selection and growth processes now known or developed in the future may be used in accordance with the present invention. Moreover, the listings of bacteria and temperature-based classifications set forth herein are provided for illustration only, and are not in any way limiting of the bacteria that may be used in accordance with the present invention. Any biological mediated method that utilizes at least one microbial agents, microorganisms, bacteria, archaea, combinations thereof and the like, which are capable of at least partially oxidizing iron and/or reducing sulfur bearing materials, may be used in accordance with the methods herein described.

Figure 2:
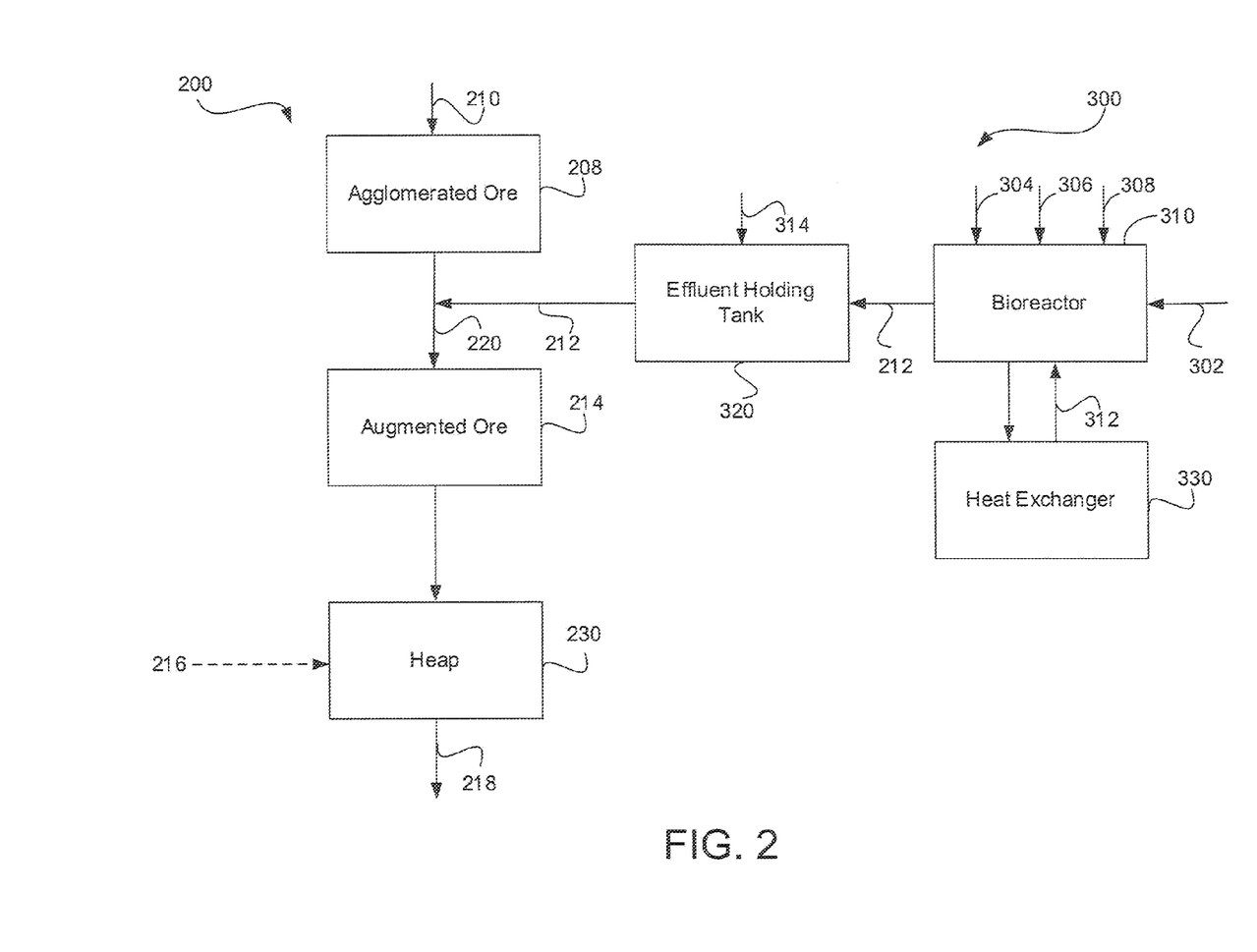
FIG. 2 is a flow diagram illustrating a leaching process enhanced through bio-augmentation in accordance with various embodiments of the present invention.

As will be discussed in further detail herein, it is desirable to establish a substantially self-sustaining bacteria population to facilitate bio-augmentation 220. The sustainability of such a population may be promoted by adjusting various parameters of a reaction environment in a bioreactor 310, including, for example, controlling temperature, oxygen availability, agitation, and nutrient addition.

As will be appreciated by those skilled in the art, bioreactors for culturing and/or maintaining a colony or population of active bacteria are well-known in the art. Any such bioreactor that may be useful to grow and maintain a population of active bacteria that will be useful in heap 230 may be used in accordance with the present invention. As used herein, a bioreactor is any device or system that supports growth and/or maintenance of active bacteria. A bioreactor typically includes inlets for nutrients, oxygen, carbon dioxide, an acid, and/or a base, of which flow rates can be controlled and, in some cases, monitored. Control of the bioreactor for temperature, pH, and dissolved oxygen content may be desired. In addition, a bioreactor is typically agitated and speeds and circulation rates will be closely monitored and controlled. Typically, bioreactors used in the industry are vessels which include sensors and control systems, such that the environment in which active bacteria are grown and/or maintained is tightly controlled for maximum yield of bacteria and minimal mutation thereof. Further, in various embodiments, a bioreactor may receive a portion of ore, water, or metal-bearing material 202.

As will be appreciated, aeration connected to a bioreactor can provide both oxygen and circulation to the solution in the bioreactor. In general, oxygen delivery requirements are a function of, among other things, the oxygen requirements for optimized bacterial growth and activity as well as oxygen requirements for sulfur and/or iron oxidation reaction. The amount of oxygen dissolved in the solution may affect the kinetics of bacterially augmented leaching. For example, in general, the oxidation rate increases as dissolved oxygen increases, up to a value where mass transfer of oxygen is no longer rate determining. The exact value of this requirement is dependent upon many factors, including concentration of dissolved solids in solution, the bacteria population and activity, the temperature, agitation, and other such solution conditions. Elevation, vessel design, and the amount of dissolved oxygen also affects the active state of bacteria. For example, after reaching the active bio-oxidation stage of its life cycle, bacteria may lapse into dormant stage or die if oxygen concentrations fall below a critical value. Once such a dormant stage is reached, bacteria may be slow to recover once higher oxidation concentrations are subsequently restored.

Referring now to FIG. 2, in accordance with various embodiments, effluent solution 212 may be produced in bio-augmentation plant 300. Bio-augmentation plant 300 comprises at least one bioreactor 310 and effluent holding tank 320. Bioreactor 310 and effluent holding tank 320 comprise any suitable bioreactor or effluent holding tank known in the art or hereafter developed. Bioreactor 310 may comprise a source of bacteria 302, a source of water 304, a source of nutrients 306, and a source of air 308. Bioreactor 310 can further contain an agitator, which may be utilized to mix the ingredients within bioreactor 310. Heat exchanger 330 may be coupled with bioreactor 310 to circulate hot liquid 312, the purpose of which will be further discussed herein.

Effluent solution 212 may be prepared by adding bacteria 302, water 304, and nutrients 306 into bioreactor 310. Various strains of bacteria 302 as discussed herein may be useful depending upon the nature of the Metal-bearing material 202 and the conditions under which bio-oxidation occurs. Examples of bacteria 302 may include *thiobacillus, leptospirillum*, and/or *sulfobacillus* sp. as discussed above. Various strains of bacteria or archaea or other appropriate microorganisms 302 may be suitable for catalyzing oxidation reactions, including various mesophiles, thermophiles, and/or the like as discussed above. In general, the kinetics of biological oxidation may be a function of any one or more conditions, such as, for example, but not limited to: ore mineralogy, solution chemistry temperature, pH, dissolved oxygen concentration, mass transfer, and/or metal-bearing material 202 particle size.

Though bio-oxidizing biological materials, including bacteria, archaea, or other suitable microorganisms, derive energy, in part, from the oxidation of sulfur or iron, additional nutrients 306 may aid in cell growth and oxidation functions. In various embodiments, nutrients 306 may comprise pyrite, elemental sulfur, ferrous iron, ammonium sulfate, potassium sulfate, ammonia, phosphate, potassium, and/or magnesium. Nutrients 306 may be mixed prior to entry into bioreactor 310 or may be added individually into bioreactor 310. Nutrients 306 may be mixed in any manner known in the art. Nutrients 306 provide material to enable population growth and/or energy generation for bacteria 302.

However, other nutrient constituents and concentrations may be used, depending on the precise requirements and conditions of the desired system. For example, the nutrient constituents of ambient air, such as carbon dioxide, may also be used to enrich the reaction media. Other forms of enriched air may also be used in accordance with the present invention, including, for example, enriched carbon dioxide and/or enriched oxygen. However, enrichment of the reaction media may proceed by any other suitable method, now known or developed in the future.

Bio-oxidation rates are subject, in part, to the rate limiting conditions described herein, such as, for example, oxygen mass transfer and sulfur substrate availability. In addition, induction times for bio-oxidizing activity, growth cycles, biocide activities, bacteria variability, and the like, as well as economic considerations, all affect the rates and duration of bio-oxidation in accordance with various embodiments of the present invention.

Still referring to FIG. 2, in an exemplary embodiment, bacteria 302, water 304, and nutrients 306 may be mixed within bioreactor 310 by an agitator to form effluent solution 212. Air source 308 provides compressed air to the bioreactor 310 to further agitate effluent solution 212 and provide bacteria 302 with oxygen to further enable the growth of bacteria 302.

In an exemplary embodiment, hot liquid 312 may be introduced into the bioreactor utilizing heat exchanger 330 and a pump. The hot liquid 312 may be in any form that provides heat to bioreactor 310. Hot liquid 312 is introduced into bioreactor 310 to encourage population growth of bacteria 302 contained therein.

Effluent solution 212 passes from bioreactor 310 to effluent holding tank 320. Effluent holding tank 320 may comprise air source 314, to further agitate effluent solution 212 and/or provide bacteria 302 in effluent solution 212 with oxygen. Effluent solution 212 is applied to agglomerated ore 208 to form augmented ore 214. As discussed herein, in an aspect of the present invention, agglomerated ore 208 is transported to heap 230 via a conveyor belt and effluent solution 212 is applied to agglomerated ore 208 during transportation to form augmented ore 214. Further, effluent solution 212 can be applied to agglomerated ore 208 in an irrigation solution utilizing low pressure spray nozzles to form augmented ore 214.

In an exemplary embodiment, effluent solution 212 is at least one of an effluent from a bioreactor and a raffinate. In an aspect of this exemplary embodiment, effluent solution 212 is only a raffinate.

Referring now to FIGS. 1 and 2, in an exemplary embodiment, augmented ore 214 is formed into heap 230. Although any means of heap construction may be used, conveyor belt stacking minimizes compaction of augmented ore 214 within heap 230. Minimizing compaction in the stacking of heap 230 can allow oxygen and/or nutrients greater access to bacteria 302 throughout heap 230, which allows uniform leaching of heap 230 and improves metal recovery from heap 230. Other means of stacking such as end dumping with a dozer or top dumping can lead to regions of reduced fluid flow within heap 230 due to increased compaction and degradation of augmented ore 214.

In various embodiments, augmented ore 214 may be placed on a lined leach pad or impermeable geologic formation via conveyor stacking, truck dumping, loader-assisted stacking, and/or a combination thereof. The height of heap 230 may range from about 5 meters to about 100 meters, depending upon various factors. In an aspect of the present invention, augmented ore 214 can be layered on top of an existing heap, a partially formed heap, a depleted heap, portions thereof, or combinations thereof.

In accordance with an exemplary embodiment, heap 230 may be further augmented via stream 216 after formation. In accordance with an exemplary embodiment, nutrients such as pyrite, ammonium sulphate, and potassium phosphate may optionally be added to heap 230 via stream 216. Further, in accordance with an exemplary embodiment, heap 230 may be further augmented by applying, raffinate to heap 230 via stream 216, as will be further discussed below. Stream 216 can be raffinate, raffinate and nutrients, raffinate and acid, or raffinate and bacteria or combinations thereof. Stream 216 can comprise a bacteria concentration significantly below that of effluent solution 212. Accordingly in various embodiments, heap 230 yields metal-bearing solution 218.

Figure 3:
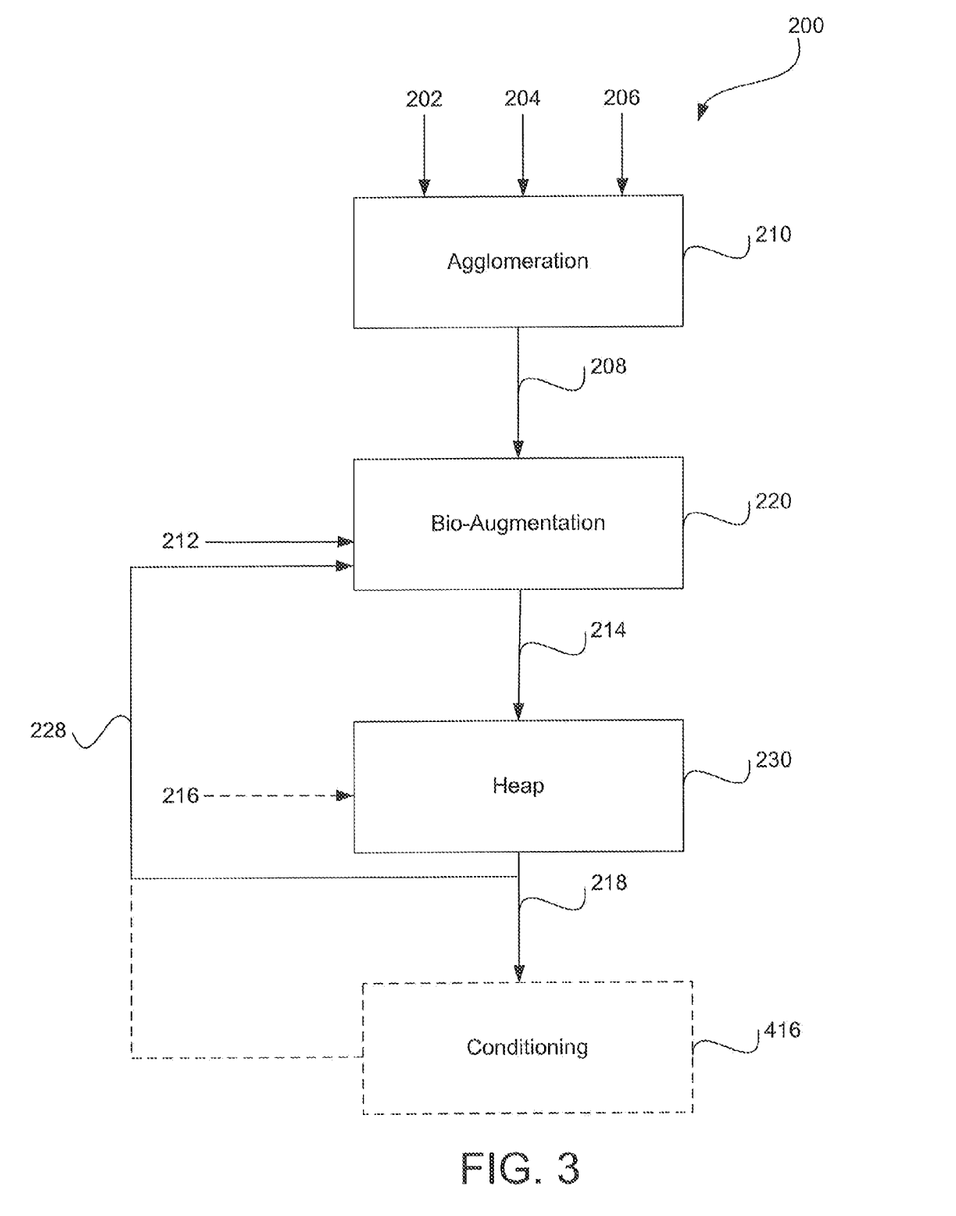
FIG. 3 is a flow diagram illustrating a leaching process enhanced through bio-augmentation in accordance with various embodiments of the present invention.

Now with reference to FIG. 3, a bio-augmentation leaching process 200 is illustrated according to various embodiments of the present invention. A portion of metal-bearing solution 218, indicated as pregnant leach stream ("PLS") 228, can be directed to bio-augmentation 220. PLS 228 contains at least a portion of bacteria 302. PLS 228 can be combined with effluent solution 212 or can be applied separately to agglomerated ore 208. Use of PLS 228 in bio-augmentation 220 may be advantageous since it may contain a distribution of strains of bacteria 302 which are effective in leaching. Furthermore, PLS 228 can provide a source of at least one of acid and water. In accordance with one aspect of the present invention, depending on the process and/or apparatus used in conditioning 416, it may be advantageous to direct PLS 228 from conditioning 416 to bio-augmentation 220. For example, overflow from a solid-liquid phase separation unit or similar apparatus employed in conditioning 416 may be directed to bio-augmentation 220 for use in further inoculating agglomerated ore 208 with bacteria 302.

PLS 228 and effluent solution 212 may be applied to agglomerated ore 208, individually or in any combination using any means described herein, known to those skilled in the art, or hereafter devised. For example, the combination of PLS 228 and effluent solution 212 may be applied to agglomerated ore 208 moving on a conveyor by use of irrigation employing, for example, sprayer nozzles above the conveyor. In another example, PLS 228 and effluent solution 212 may be applied to agglomerated ore 208 in series. In this regard, PLS 228 may be applied before effluent solution 212 is applied. The application of PLS 228 to agglomerated ore 208 on a first section of a conveyor adds a portion of bacteria and acid to begin bio-augmentation 220 and may increase the effectiveness of effluent solution 212 which is applied to agglomerated ore 208 on a second section of the conveyor. However, effluent solution 212 maybe applied before PLS 228. The application of effluent solution 212 to agglomerated ore 208 on a first section of a conveyor inoculates agglomerated ore 208 to begin bio-augmentation 220 and PLS 228 can be applied on a second section of the conveyor to ensure that effluent solution 212 does not evaporate during transportation to the heap 230.

The Examples set forth herein are illustrative of conventional heap leaching techniques and various aspects of certain preferred embodiments of the present invention. The process conditions and parameters reflected therein are intended to exemplify various aspects of the invention, and are not intended to limit the scope of the claimed invention.

As discussed above, conventional heap leaching techniques are unsatisfactory in a number of ways. The first two examples listed below, Examples 1 and 2, contain test data from conventional heap leaching techniques. The second two examples listed below, Examples 3 and 4, contain test data from bio-augmentation heap leaching techniques of the present invention.

Example 1

An example of a heap leaching technique employs the introduction of a suitable bacterial strain into the process, generally via a raffinate, during an agglomeration step. Specifically, a heap leach test was performed utilizing a raffinate in the agglomeration step and a raffinate in the irrigation solution. The results of such test indicated by reference numeral 1 in FIG. 4.

Example 2

An example of a heap leaching technique employs the introduction of a suitable bacterial strain into the process, generally during an agglomeration step. Specifically, a heap leach test was performed utilizing raffinate at 0.50% bacteria in the agglomeration step and a raffinate in the irrigation solution. The results of such test indicated by reference numeral 2 in FIG. 4.

Example 3

An example of a bio-augmentation heap leach employs the introduction of bacteria in the irrigation solution. Specifically, a heap leach test was performed utilizing raffinate in the agglomeration step and a raffinate at 0.01% bacteria in the irrigation solution. The irrigation solution of Example 3 was continuously applied. The results of such test indicated by reference numeral 3 in FIG. 4.

Example 4

An example of a bio-augmentation heap leach employs the introduction of bacteria in the irrigation solution. Specifically, a heap leach test was performed utilizing raffinate and 5 kg/t acid in the agglomeration step and a raffinate at 1.00% bacteria in the irrigation solution. The irrigation solution of Example 4 was applied for 2 days. The results of such test indicated by reference numeral 4 in FIG. 4.

Figure 4:
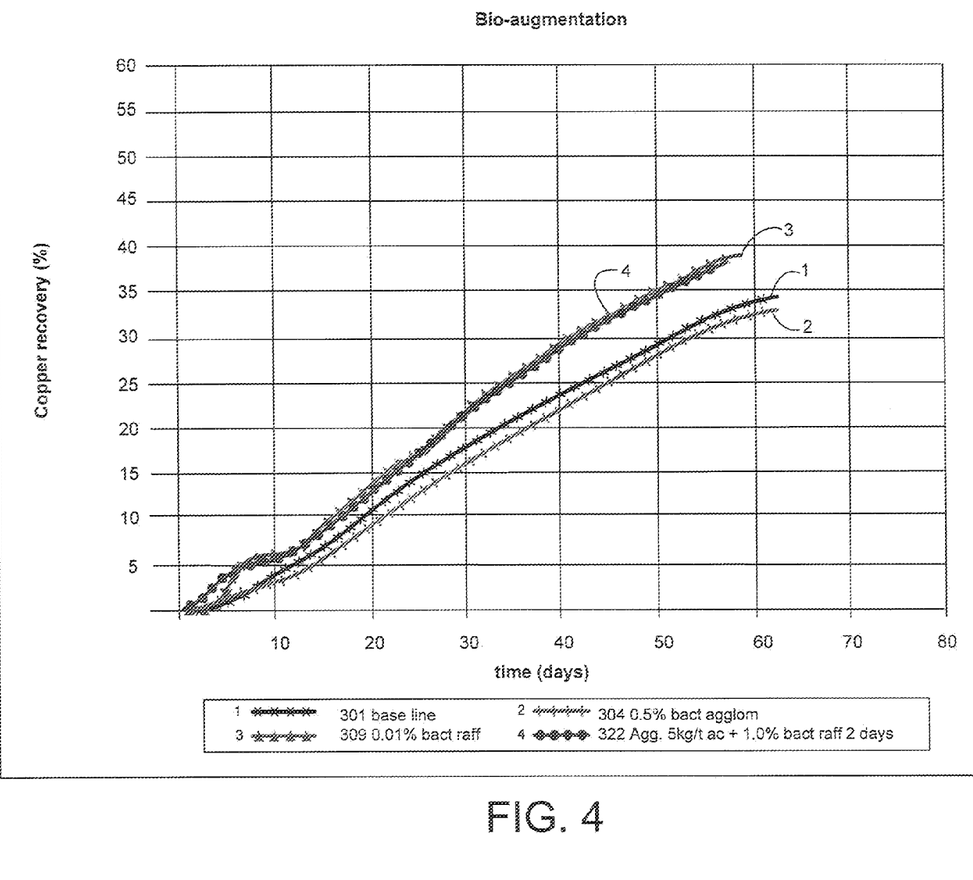
FIG. 4 is a graph illustrating data of the recovery of copper in accordance with various embodiments of the present invention.

As illustrated in FIG. 4, the copper recovery is greater in Examples 3 and 4 employing exemplary embodiments of the present invention than in conventional heap leaching techniques described in Examples 1 and 2.

For ease of discussion, the description of various exemplary embodiments of the present invention herein generally focuses on the recovery of desired metal values from chalcopyrite-containing ore or concentrate; however, any suitable metal bearing material may be utilized. In accordance with an exemplary embodiment, metal values from the metal-bearing product stream are removed during an electrowinning step, either with or without a solution conditioning step such as solvent extraction or ion exchange, to yield a pure, cathode copper product or a copper powder product.

Figure 5:
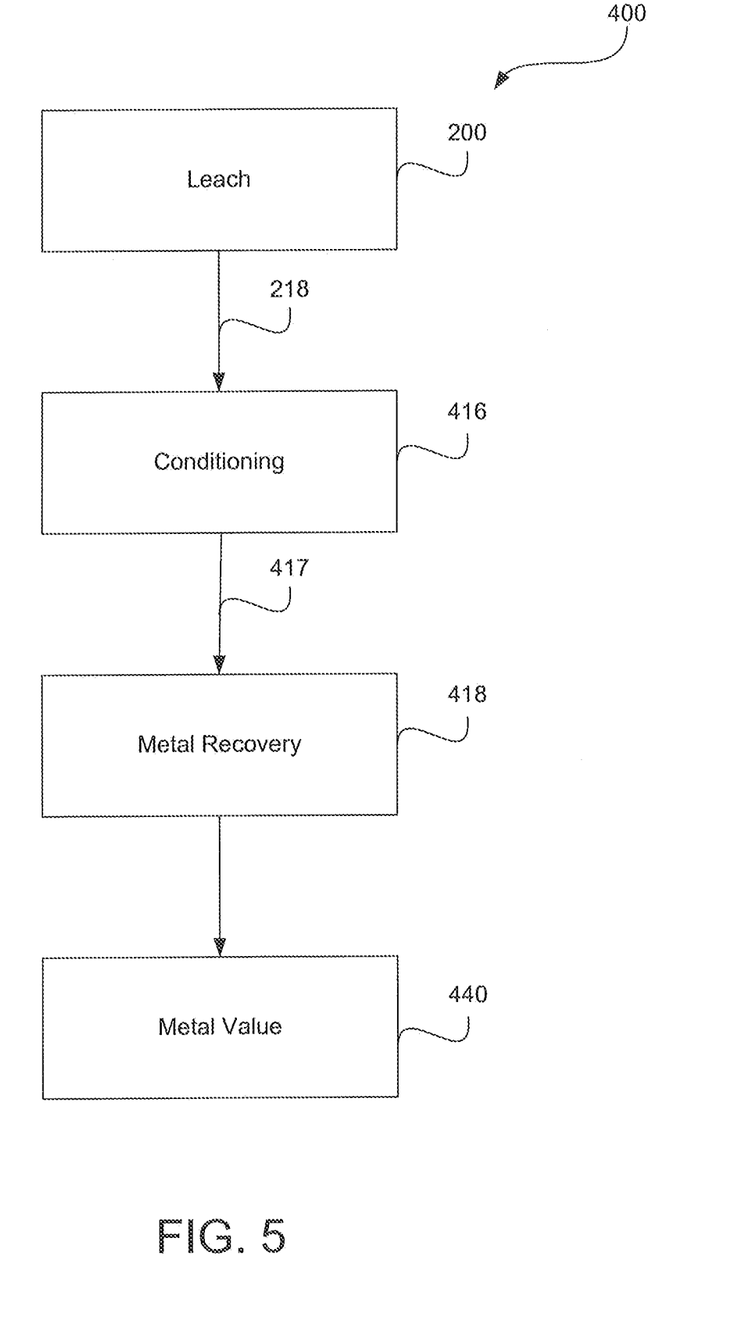
FIG. 5 is a flow diagram illustrating a metal recovery process in accordance with various embodiments of the present invention.

Referring now to FIG. 5, metal recovery process 400 may be any process for recovering copper and/or other metal values, and may include any number of preparatory or conditioning steps. For example, metal-bearing solution 218 may be prepared and conditioned for metal recovery through one or more chemical and/or physical processing steps. Metal-bearing solution 218 from bio-augmentation heap leaching process 200 may be conditioned to adjust the composition, component concentrations, solids content, volume, temperature, pressure, and/or other physical and/or chemical parameters to desired values and thus to form a suitable metal-bearing solution. Generally, a properly conditioned metal-bearing solution 218 will contain a relatively high concentration of soluble copper in, for example, an acid sulfate solution, and preferably will contain few impurities. In accordance with one aspect of an exemplary embodiment of the invention, however, impurities in the conditioned metal-bearing solution ultimately may be decreased through the use of a separate solvent/solution extraction stage, as discussed herein. Moreover, the conditions of metal-bearing solution 218 preferably are kept substantially constant to enhance the quality and uniformity of the copper product ultimately recovered.

Referring to FIGS. 1-3 and 5, in accordance with various aspects of the present invention, a metal-bearing material 202 is provided for processing in accordance with metal recovery process 400. Metal-bearing material 202 may be an ore, a concentrate, or any other material from which metal values may be recovered, as discussed herein. Metal values such as, for example but not limited to, copper, gold, silver, platinum group metals, nickel, cobalt, molybdenum, rhenium, uranium, rare earth metals, and the like, may be recovered from metal-bearing material 202 in accordance with various embodiments of the present invention. Various aspects and embodiments of the present invention, however, prove especially advantageous in connection with the recovery of copper from copper sulfide concentrates and/or ores, such as, for example, chalcopyrite ($CuFeS_2$), chalcocite ($Cu_2S$), bornite ($Cu_5FeS_4$), covellite (CuS), enargite ($Cu_3AsS_4$), digenite ($Cu_9S_5$), and/or mixtures thereof. Thus, in various embodiments, metal-bearing material 202 is a copper ore or concentrate, and in an exemplary embodiment, metal-bearing material 202 is a copper sulfide ore or concentrate.

With reference to FIG. 5, metal recovery process 400 is illustrated according to various embodiments of the present invention. Metal recovery process 400 comprises leach process 200, conditioning 416, and metal-recovery 418. In various embodiments, leach process 200 can be any method, process, or system as presented herein that enables a metal value to be leached from a metal-bearing material.

In accordance with various embodiment of the present invention, leach process 200 comprises a bio-augmentation heap leaching process. In accordance with an exemplary embodiment, the bio-augmentation heap leaching process can comprise providing an metal-bearing material 202 or ore, agglomerating the metal-bearing material 202 or ore, adding bacteria to the agglomerated ore 208 to form augmented ore 214, forming heap 230 with augmented ore 214, and may further include augmenting heap 230 to produce metal-bearing solution 218, as discussed herein.

In various embodiments, leaching 200 provides metal bearing solution 218 for conditioning 416. In various embodiments, conditioning 416 can be for example, but is not limited to, a solid liquid phase separation step, a pH adjustment step, a dilution step, a concentration step, a metal precipitation step, a filtration step, a settling step, a temperature adjustment step, a solution/solvent extraction step, an ion exchange step, a chemical adjustment step, a purification step, a precipitation step, and the like, as well as, combinations thereof. In an exemplary embodiment in which conditioning produces a solid product by, for example, selective precipitation, conditioning 416 can include a solid liquid phase separation step configured to yield metal rich solution 417 and a metal bearing solid. In various embodiments, such as, for example, when a precipitate is formed, the conditioning 416 may include a solid-liquid phase separation. In an exemplary embodiment, conditioning 416 includes a settling/filtration step. In various embodiments, conditioning 416 produces metal-rich solution 417.

In various embodiments, metal-rich solution 417 may be subjected to metal recovery 418 to yield metal value 440. In exemplary embodiments, metal recovery 418 can comprise electrowinning metal-rich solution 417 to yield recovered metal value 440 as a cathode. In one exemplary embodiment, metal recovery 418 may be configured to employ conventional electrowinning processes and include a solvent extraction step, an ion exchange step, an ion selective membrane, a solution recirculation step, and/or a concentration step. In one preferred embodiment, metal recovery 418 may be configured to subject metal-rich solution 417 to a solvent extraction step to yield a rich electrolyte solution, which may be subject to an electrowinning circuit to recover a desired metal value 440. In another exemplary embodiment, metal recovery 418 may be configured to employ direct electrowinning processes without the use of a solvent extraction step, an ion exchange step, an ion selective membrane, a solution recirculation step, and/or a concentration step. In another preferred embodiment, metal recovery 418 may be configured to feed metal-rich solution 417 directly into an electrowinning circuit to recover a desired metal value 440. In an especially preferred embodiment, metal value 440 is copper.

With further reference to FIG. 5, metal-rich solution 417 may be suitably treated in metal-recovery 418 to advantageously enable the recovery of a metal value 440, such as, for example, a copper value. In one exemplary embodiment, metal-recovery 418 comprises direct electrowinning (DEW). In another exemplary embodiment, metal-recovery 418 comprises solvent extraction and electrowinning (SX/EW). In another exemplary embodiment, metal-recovery 418 is configured to produce a copper powder.

As discussed above, the present invention includes a heap leaching process utilizing bio-augmentation to improve the efficiency of metal extraction operations. The present invention has been described with reference to various exemplary embodiments. However, many changes, combinations, and modifications may be made to the exemplary embodiments without departing from the scope of the present invention. For example, the various components may be implemented in alternate ways. These alternatives can be suitably selected depending upon the particular application or in consideration of any number of factors associated with the operation of the system. In addition, the techniques described herein may be extended or modified for use with other metal extraction processes. These and other changes or modifications are intended to be included within the scope of the present claims.

The present invention has been described above with reference to a number of exemplary embodiments. It should be appreciated that the particular embodiments shown and described herein are illustrative of the invention and its best mode and are not intended to limit in any way the scope of the invention as set forth in the claims. Those skilled in the art having read this disclosure will recognize that changes and modifications may be made to the exemplary embodiments without departing from the scope of the present invention. For example, various aspects and embodiments of this invention may be applied to recovery of metals other than copper, such as nickel, zinc, cobalt, and others. Although certain preferred aspects of the invention are described herein in terms of exemplary embodiments, such aspects of the invention may be achieved through any number of suitable means now known or hereafter devised. Accordingly, these and other changes or modifications are intended to be included within the scope of the present invention.

It is believed that the disclosure set forth above encompasses at least one distinct invention with independent utility. While the invention has been disclosed in the exemplary forms, the specific embodiments thereof as disclosed and illustrated herein are not to be considered in a limiting sense as numerous variations are possible. Equivalent changes, modifications and variations of various embodiments, materials, compositions and methods may be made within the scope of the present invention, with substantially similar results. The subject matter of the inventions includes all novel and non-obvious combinations and sub combinations of the various elements, features, functions and/or properties disclosed herein.

Benefits, other advantages, and solutions to problems have been described herein with regard to specific embodiments. However, the benefits, advantages, solutions to problems, and any element or combination of elements that may cause any benefit, advantage, or solution to occur or become more pronounced are not to be construed as critical, required, or essential features or elements of any or all the claims or the invention. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above.

What is claimed is:

1. A method comprising:
   inoculating an agglomerated ore comprising a metal-bearing material with bacteria to form an augmented ore;
   forming at least a portion of a heap with said augmented ore;
   leaching said augmented ore in a heap leach to yield a metal-bearing solution; and
   directing at least a portion of said metal-bearing solution to said agglomerated ore before said step of leaching.

2. The method according to claim 1, wherein said bacteria is provided from at least one of an effluent solution and a pregnant leach stream, wherein said effluent solution is from at least one of a bioreactor, a heap leach, and a raffinate.

3. The method according to claim 2, wherein said step of inoculating said agglomerated ore comprises adding at least one of said effluent solution and said pregnant leach stream to said agglomerated ore with bacteria to form an augmented ore before said step of leaching.

4. The method according to claim 1, further comprising transporting said agglomerated ore during said step of inoculating.

5. The method according to claim 4, wherein said transporting said agglomerated ore comprises transporting said ore on a conveyor.

6. The method according to claim 1, further comprising adding at least one of a raffinate and a nutrient to said bacteria in said heap leach.

7. The method according to claim 6, wherein said nutrient comprises at least one of pyrite, ammonium sulfate, and potassium phosphate.

8. A method comprising:
   agglomerating a metal-bearing material to form an agglomerated ore;
   adding bacteria to an agglomerated ore to form an augmented ore;

leaching said augmented ore in a heap leach to yield a metal-bearing solution;
directing at least portion of said metal-bearing solution to said agglomerated ore;
conditioning at least a portion of said metal-bearing solution to yield a conditioned pregnant leach stream; and
directing at least a portion of said conditioned pregnant leach stream to said agglomerated ore before said step of leaching.

9. The method according to claim 8, further comprising:
conditioning at least a portion of said metal-bearing solution to yield an electrolyte solution suitable for electrowinning; and
electrowinning said electrolyte solution to yield copper.

10. The method according to claim 8, wherein said conditioning comprises at least one of a solid liquid phase separation step, a pH adjustment step, a dilution step, a concentration step, a metal precipitation step, a filtration step, a settling step, a temperature adjustment step, a solution/solvent extraction step, an ion exchange step, a chemical adjustment step, a purification step, and a precipitation step.

\* \* \* \* \*